(12) United States Patent
Lu et al.

(10) Patent No.: US 10,498,118 B2
(45) Date of Patent: Dec. 3, 2019

(54) CABLE STRIPPING TOOL

(71) Applicant: Hanlong Industrial Co., Ltd., New Taipei (TW)

(72) Inventors: Hsiu-Ru Lu, New Taipei (TW); Hsing-Chieh Ho, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 38 days.

(21) Appl. No.: 15/864,042

(22) Filed: Jan. 8, 2018

(65) Prior Publication Data
US 2019/0103735 A1    Apr. 4, 2019

(30) Foreign Application Priority Data

Oct. 3, 2017   (TW) .............................. 106214709 U (51) Int. Cl.
*H02G 1/12* (2006.01)
*G02B 6/245* (2006.01)
*G02B 6/44* (2006.01)

(52) U.S. Cl.
CPC ........... *H02G 1/1217* (2013.01); *G02B 6/245* (2013.01); *G02B 6/4497* (2013.01)

(58) Field of Classification Search
CPC ..... H02G 1/1217; G02B 6/245; G02B 6/4497
USPC ................................................. 30/90.4, 91.1
See application file for complete search history.

(56) References Cited

U.S. PATENT DOCUMENTS

| | | | | |
|---|---|---|---|---|
| 2,141,002 A * | 12/1938 | Huff | ..................... | H02G 1/1231 30/90.7 |
| 2,683,308 A * | 7/1954 | Cook, Jr. | ............. | H02G 1/1217 30/91.1 |
| 4,587,731 A * | 5/1986 | Krampe | ............... | H02G 1/1224 30/90.1 |
| 4,905,373 A * | 3/1990 | Krampe | ............... | H02G 1/1229 30/90.6 |
| 4,947,549 A * | 8/1990 | Genovese | ............... | G02B 6/245 30/90.8 |
| 6,079,104 A * | 6/2000 | Krampe | ............... | H02G 1/1204 30/123 |
| 8,353,107 B2 * | 1/2013 | Daggett | ............... | H02G 1/1229 30/114 |
| 9,819,161 B2 * | 11/2017 | Scirbona | ............... | H02G 1/1217 |
| 2019/0103735 A1 * | 4/2019 | Lu | ......................... | H02G 1/1217 |

* cited by examiner

*Primary Examiner* — Hwei-Siu C Payer
(74) *Attorney, Agent, or Firm* — Alan D. Kamrath; Karin L. Williams; Mayer & Williams PC (57) ABSTRACT

The present invention discloses a cable stripping tool, which is used for stripping an outer surface of a cable. The cable stripping tool includes a first main body element and a second main body element corresponding to each other. The first main body element has a longitudinal axis, and includes a first cable containing groove, a first handling portion and a first pivoting portion. The first cable containing groove is disposed along the longitudinal axis. The first handling portion extends from a side wall of the first main body element, with the side wall opposite to the first cable containing groove. The first pivoting portion is located on a side surface of the first main body element. The second main body element includes a second cable containing groove, a second handling portion, and a second pivoting portion, and the second pivoting portion pivots to the first pivoting portion.

12 Claims, 6 Drawing Sheets

CABLE STRIPPING TOOL

BACKGROUND OF THE INVENTION

1. Field of the Invention

The present invention relates to a cable stripping tool, and more particularly, to a cable stripping tool which can be used for stripping an outer surface of a cable.

2. Description of the Related Art

Generally speaking, the periphery of a signal cable or power cable will be coated with at least one outer layer to protect the transmission wire body inside the cable. These outer layers are applied according to different requirements and also correspond to a variety of different wires, such as electrical cables, coaxial cables, optical cables, or the like. When carrying out power dispatch or other operations, it is necessary for the user to strip the outer surface first, therefore, there are various types of cable stripping tools available for the user to choose from.

When using an existing cable stripping tool, first the user places the wire in the cable stripping tool to be perpendicular to a longitudinal axis of the cable stripping tool, then the user holds the handling portion (hereinafter referred to as grip) on one side of the wire. For the user, the design of the grip on one side of the wire is less favorable for the application of force, which in turn imposes a burden on the user's wrist. Therefore, at present, existing cable stripping tools are only used for wires having softer or thinner outer layers. For wires having hard-coated outer layers, such as optical cables, the user still has to use a utility knife or other type of blades to strip the wire having harder outer layer. Therefore, it is necessary to propose a cable stripping tool that can be used to strip wires having harder outer layers.

SUMMARY OF THE INVENTION

In order to solve the problems described above, it is an object of the present invention to provide a cable stripping tool, which is designed to have a first handling portion extended from a side wall of a first main body element, with the side wall opposite to a first cable containing groove, and a second handling portion extended from a side wall of a second main body element, with the side wall opposite to a second cable containing groove, therefore, when the wire is placed in the cable stripping tool, the first handling portion and the second handling portion are located on opposite sides of the wire to solve the problem of the conventional stripping tool cable stripping tool being difficult to apply force.

In order to achieve the above object, the present invention provides a cable stripping tool for stripping an outer surface of a cable. The cable stripping tool includes a first main body element and a second main body element. The first main body element has a longitudinal axis, and includes a first cable containing groove, a first blade, and a first handling portion and a first pivoting portion. The first cable containing groove is disposed along the longitudinal axis. The first blade is disposed in the first main body element with at least a portion of the first blade protruding out of the first cable containing groove. The first handling portion is extended from a side wall of the first main body element, with the side wall opposite to the first cable containing groove. The first pivoting portion is located on a first side surface of the first main body element, with the first side surface adjacent to the first cable containing groove. The second main body element includes a second cable containing groove, a second blade, a second handling portion, and a second pivoting portion. The second cable containing groove corresponds to the first cable containing groove. The second blade is disposed in the second main body element with at least a portion of the second blade protruding out of the second cable containing groove. The second handling portion is extended from a second side wall of the second main body element, with the second side wall opposite to the second cable containing groove and the second handling portion corresponds to the first handling portion. The second pivoting portion is located on a second side surface of the second main body element, with the second side surface adjacent to the second cable containing groove and the second pivoting portion pivots to the first pivoting portion.

According to an embodiment of the present invention, the second main body element opens and closes relative to the first main body element by using the first pivoting portion and the second pivoting portion as axes.

According to an embodiment of the present invention, the cable is disposed between the first cable containing groove and the second cable containing groove, and the longitudinal axis and the cable are parallel to each other.

According to an embodiment of the present invention, the first handling portion and the second handling portion extend in a direction perpendicular to that of the longitudinal axis.

According to an embodiment of the present invention, the cable stripping tool further includes a snap fastening element disposed between the first main body element and the second main body element.

According to an embodiment of the present invention, the first main body element further includes a first snap hole, the second main body element further includes two second snap holes, the first snap hole is located between the two second snap holes, and the snap fastening element further includes a snap shaft and an elastic element, the elastic element is sleeved on the snap shaft, and the snap shaft is disposed between the first snap hole and the second snap hole.

According to an embodiment of the present invention, the first pivoting portion includes two first pivoting holes, the second pivoting portion includes a second pivoting hole located between the two first pivoting holes, and the cable stripping tool further includes a pivot disposed between the first pivoting hole and the second pivoting hole.

According to an embodiment of the present invention, the first snap hole is located at a third side surface of the first main body element, with the third side surface opposite to the two first pivoting holes, the two second snap holes are located at a fourth side surface of the second main body element, with the fourth side surface opposite to the second pivoting hole.

According to an embodiment of the present invention, the first main body element and the second main body element are essentially the same in configuration.

According to an embodiment of the present invention, the first main body element further includes a first recess disposed adjacent to the first cable containing groove, and the second main body element further includes a second recess disposed adjacent to the second cable containing groove.

According to an embodiment of the present invention, the first cable containing groove and the first recess communicate with each other, the second cable containing groove and the second recess communicate with each other.

According to an embodiment of the present invention, the first cable containing groove is located at a front end of the first main body element, the first recess is located at a rear end of the first main body element, the second cable containing groove is located at a front end of the second main body element, the second recess is located at a rear end of the second main body element.

According to an embodiment of the present invention, the first handling portion is located at the rear end of the first main body element, the second handling portion is located at the rear end of the second main body element.

According to an embodiment of the present invention, the first main body element further includes a first blade containing groove located at the front end of the first main body element, the second main body further including a second blade containing groove located at the front end of the second main body.

As described above, the cable stripping tool of the present invention includes the first main body element and the second main body element, which comprise the first cable containing groove and the second cable containing groove disposed along the longitudinal axis respectively. Furthermore, the first handling portion is extended from the side wall of first main body element, with the side wall opposite to the first cable containing groove, and the second handling portion is extended from the side wall of the second main body element, with the side wall opposite to the second cable containing groove. When the wire is placed in the cable stripping tool, the longitudinal axis and the wire are parallel to each other, and the first handling portion and the second handling portion are located at two opposite sides of the wire, thereby providing better user experience and convenience when the user applying a force to the cable stripping tool to strip the outer surface of the wire.

DETAILED DESCRIPTION OF THE PREFERRED EMBODIMENT

The advantages and innovative features of the invention will become more apparent from the following detailed description when taken in conjunction with the accompanying drawings.

Figure 1:
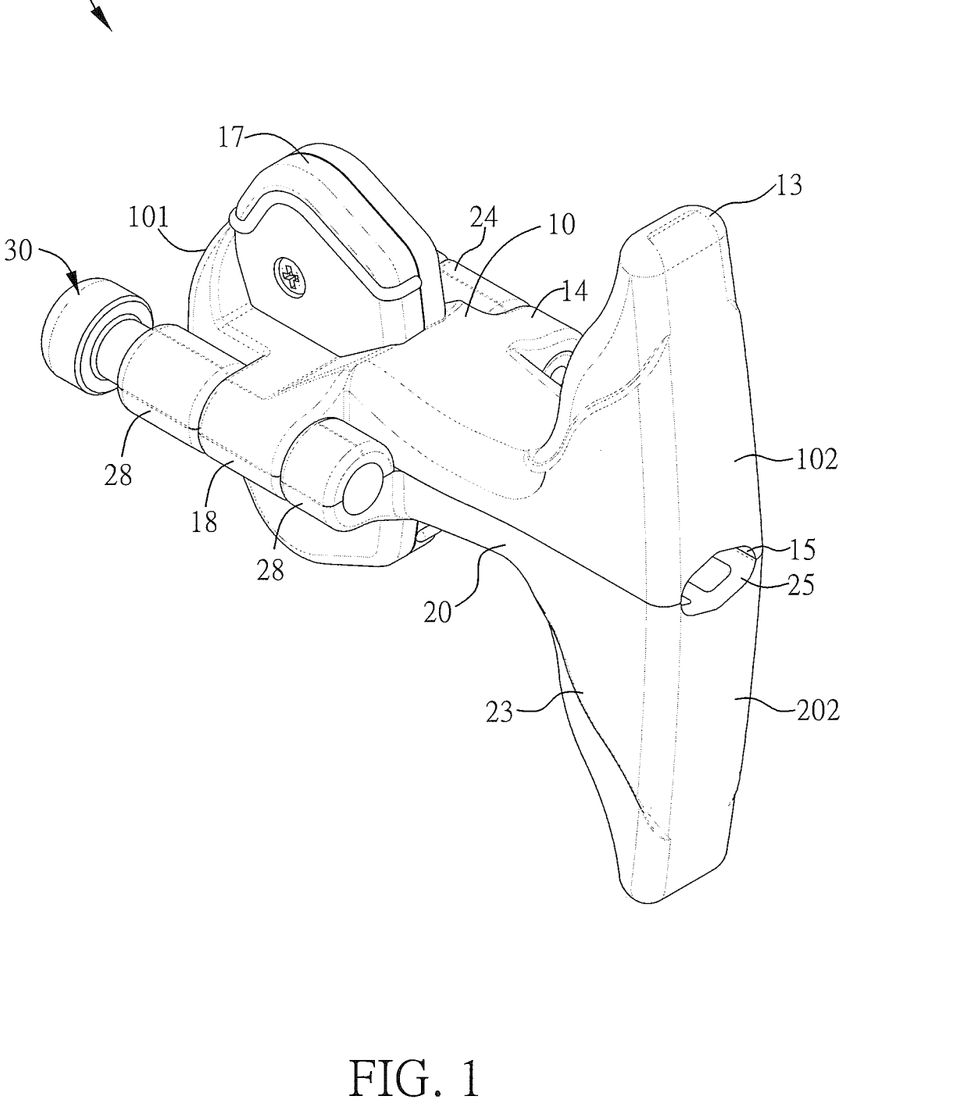
FIG. 1 is a schematic diagram of a cable stripping tool according to an embodiment of the present invention.
Figure 2:
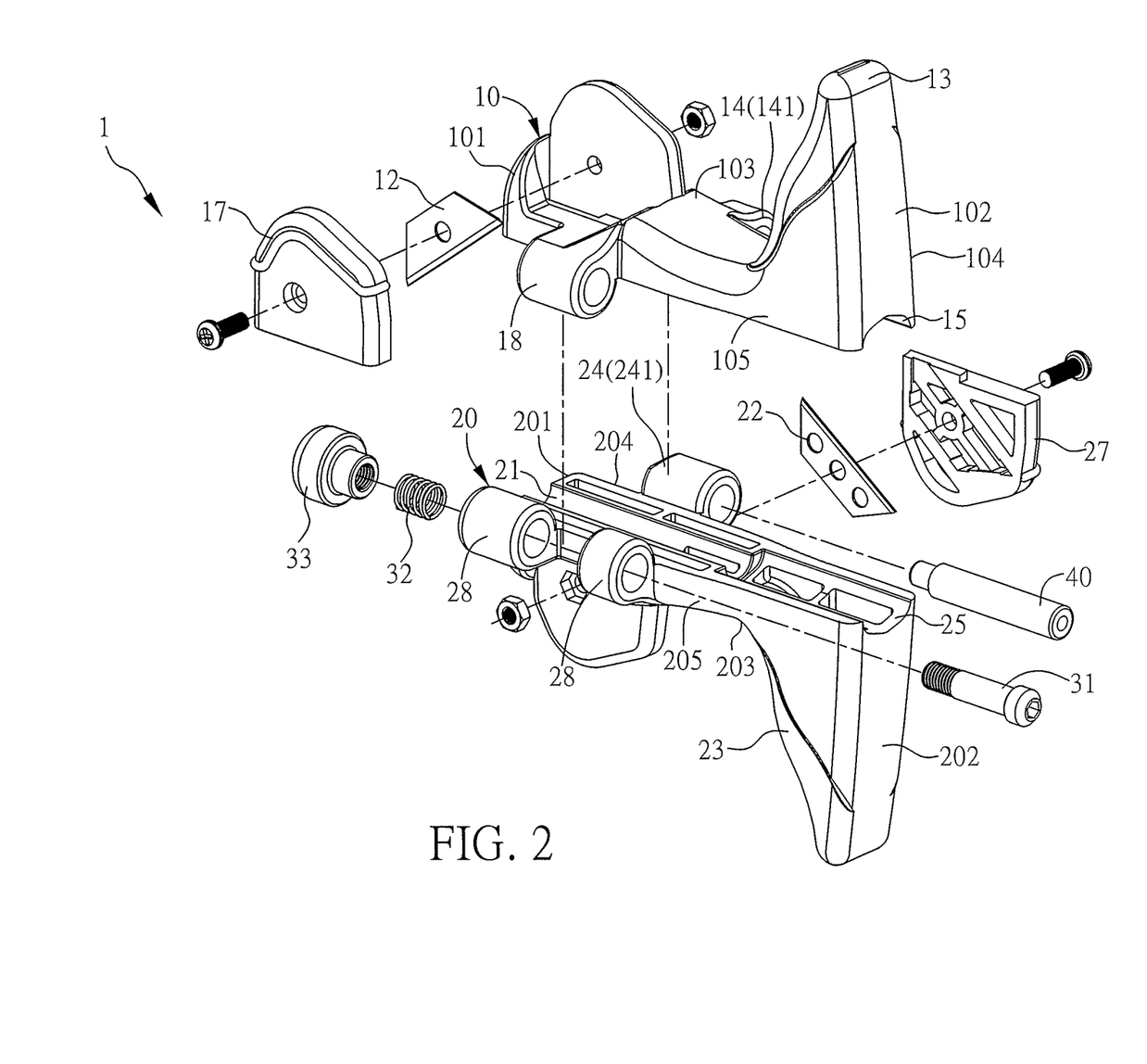
FIG. 2 is an explosive view of the stripping tool cable stripping tool shown in FIG. 1.
Figure 3:
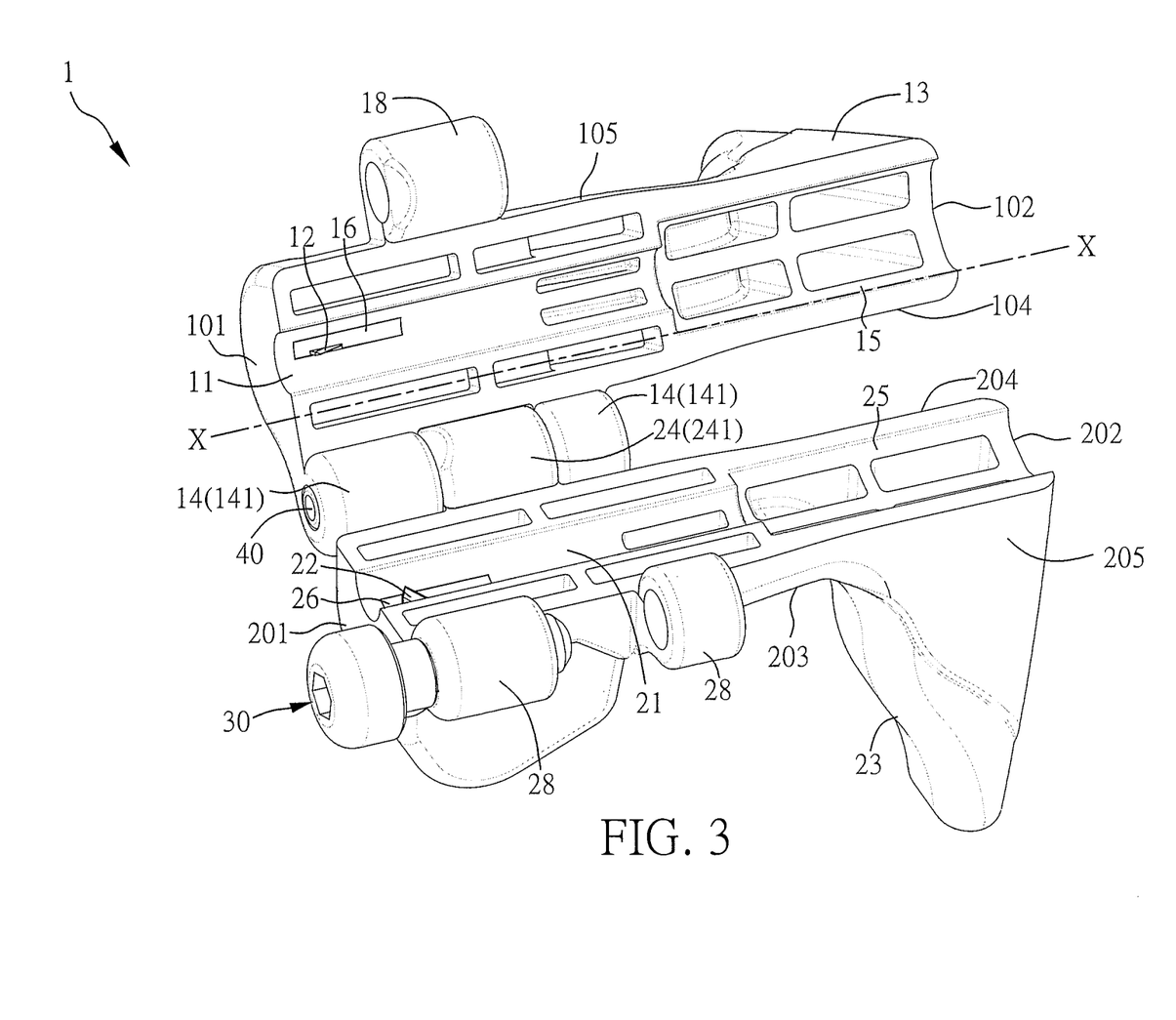
FIG. 3 is a schematic view of the cable stripping tool shown in FIG. 1 in an open state.
Figure 6:
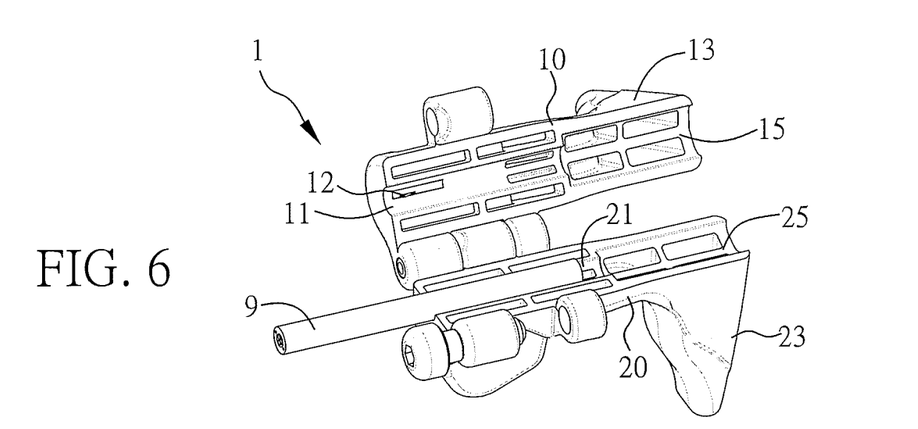
FIG. 6 is a schematic diagram of placing a wire on the cable stripping tool shown in FIG. 5.

FIG. 1 is a schematic diagram of a cable stripping tool according to an embodiment of the present invention; FIG. 2 is an explosive view of the stripping tool cable stripping tool shown in FIG. 1; and FIG. 3 is a schematic view of the cable stripping tool shown in FIG. 1 in an open state. Please refer to FIG. 1, FIG. 2, and FIG. 3 at the same time. According to an embodiment, a cable stripping tool 1 is used for stripping an outer surface of a wire 9 (the wire 9 is shown in FIG. 6), which can be electrical cables, coaxial cables, optical cables, or the like. The cable stripping tool 1 according to the present embodiment mainly includes two elements corresponding to each other, that is, the cable stripping tool 1 includes a first main body element 10 and a second main body element 20. The first main body element 10 has a longitudinal axis X. It is noted that since the cable stripping tool 1 is mainly consisted of the first main body element 10 and the second main body element 20, and their main structures also correspond to each other, so the direction of the longitudinal axis X of the first main body element 10 is also the same as that of the longitudinal axis X of the second main body element 20. The element structures and the connection relations of the first main body element 10 and the second main body element 20 are described below. The operation flow of stripping the wire 9 will be described later.

The first main body element 10 includes a first cable containing groove 11, a first blade 12, a first handling portion 13 and a first pivoting portion 14. The first cable containing groove 11 is disposed along the longitudinal axis X and the first cable containing groove 11 is preferably located at the front end 101 of the first main body element 10. The first main body element 10 of this embodiment further includes a first recess 15 which is adjacent to the first cable containing groove 11, so that the first recess 15 is located at the rear end 102 of the first main body element 10. Furthermore, the first cable containing groove 11 communicates with the first recess 15, so that the wire 9 can be placed in the first cable containing groove 11 and the first groove 15 to go through the first main body element 10 (cable stripping tool 1). In other embodiments, the first cable containing groove 11 can also extend from the front end 101 to the rear end 102 to achieve the same function.

The first blade 12 is disposed in the first main body element 10 and at least a portion of the first blade 12 protrudes out of the first cable containing groove 11. In detail, the first main body element 10 of this embodiment further includes a first blade containing groove 16 and a first blade fixing element 17, with the first blade containing groove 16 located at the front end 101 of the first main body element 10 and going through the first main body element 10 to connect the first cable containing groove 11 to the outer space. When the first blade 12 is placed in the first blade containing groove 16, the front end portion of the first blade 12 can protrude out of the first cable containing groove 11 (as shown in FIG. 3) and is fixed within the first blade containing groove 16 using the first blade fixing element 17.

The first handling portion 13 is extended from a side wall 103 of the first cable containing groove 11, which is opposite to the first cable containing groove 11. In other words, the first cable containing groove 11 and the first handling portion 13 are respectively located on two opposite sides of the first main body element 10, and the first holding portion 13 is extending in a direction perpendicular to that of the longitudinal axis X and also perpendicular to that of the first cable containing groove 11. The first handling portion 13 is located at the rear end 102 of the first main body element 10, so that the first cable containing groove 11 is diagonal to the first handling portion 13 in configuration. The first pivoting portion 14 is located at a side surface 104 (which is also referred to as a first side surface) adjacent to the first cable containing groove 11. It is noted that, in this embodiment, a side opposite to the first cable containing groove 11 is referred to as a side wall 103, and adjacent two side surfaces are referred to as side surfaces 104 and 105.

Correspondingly, the second main body element 20 includes a second cable containing groove 21, a second blade 22, a second handling portion 23 and a second pivoting portion 24. In which, the second cable containing groove 21 corresponds to the first cable containing groove 11, that is, the second cable containing groove 21 is also disposed along the longitudinal axis X and is located at the front end 201 of the second main body element 20 to correspond to the first cable containing groove 11. The second pivoting portion 24 is also located at a side surface 204 (which is also referred to as a second side surface) adjacent to the second cable containing groove 21 and interconnects with the first pivoting portion 14, thereby allowing the second main body element 20 to be opened and closed relative to the first main body element 10 with the first pivoting portion 14 and the second pivoting portion 24 acting as axes. Besides, the cable stripping tool 1 has a closed state (as shown in FIG. 1) and an open state (as shown in FIG. 3).

In this embodiment, the first cable containing groove 11 and the second cable containing groove 21 are semicircular grooves respectively. When the cable stripping tool 1 is in the closed state, the first cable containing groove 11 and the second cable containing groove 21 form a circular groove together to contain the wire 9. The size of the first cable containing groove 11 and the second cable containing groove 21 can be adjusted according to the outer diameter of the available wire 9. Similarly, the rear end 202 of the second main body element 20 further includes a second recess 25, that is, the second recess 25 is disposed adjacent to the second cable containing groove 21, and the second cable accommodating groove 21 and the second recess 25 communicate with each other. When the stripping tool cable stripping tool 1 is in the closed state, the second recess 25 may also contain the wire 9 together with the first recess 15.

Similarly, the second blade 22 is disposed in the second main body element 20. The second main body element 20 further includes a second blade containing groove 26 and a second blade fixing element 27 located at the front end 201 of the second main body element 20. After the second blade 22 is placed in the second blade containing groove 26, the second blade 22 at least partially protrudes out of the second cable receiving groove 21, and finally the second blade 22 is fixed by the second blade fixing element 27.

The second handling portion 23 is extended from the side wall 203 of the second main body element 20, which is opposite to the second cable containing groove 21, and the second handling portion 23 corresponds to the first handling portion 13. In other words, the second cable containing groove 21 and the second handling portion 23 are located on two opposite sides of the second main body element 20 respectively, and the second handling portion 23 is also extending in a direction perpendicular to that of the longitudinal axis X and is located at the rear end 202 of the second main body element 20. When the wire 9 is placed between the first cable containing groove 11 and the second cable containing groove 21 and the cable stripping tool 1 is in the closed state, the first handling portion 13 and the second handling portion 23 are located at two opposite sides of the wire 9 respectively (please refer to FIG. 7 for reference).

The cable stripping tool 1 further includes a snap fastening element 30 disposed between the first main body element 10 and the second main body element 20. In detail, the first main body element 10 further includes a first snap hole 18, the second main body element 20 further includes two second snap holes 28, with the first snap hole 18 located between the two second snap holes 28. The first snap hole 18 is located at the other side surface 105 (which are also referred to as a third side surface) of the first main body element 10, which is opposite to the first pivoting portion 14, and the second snap holes 28 are located at the other side surface 205 (which are also referred to as a fourth side surface) of the second main body element 20, which is opposite to the second pivoting portion 24. In other words, the first pivoting portion 14 and the first snap hole 18 are respectively located at two opposite side surfaces 104, 105 of the first main body element 10, and the second pivoting portion 24 and the two second snap hole 28 are respectively located at two opposite side surfaces 204, 205 of the second main body element 20.

Furthermore, the snap fastening element 30 further includes a snap shaft 31 and an elastic element 32. The elastic element 32 is sleeved on the snap shaft 31. The snap shaft 31 has one end connected to a cap 33, and the snap shaft 31 goes through the first snap hole 18 and the second snap hole 28 to be connected to the cap 33. In other words, the snap shaft 31 and the elastic element 32 of the present embodiment are placed between the first snap hole 18 and the second snap hole 28, thereby allowing the first main body element 10 and the second main body element 20 to be engaged with each other.

Figure 4A:
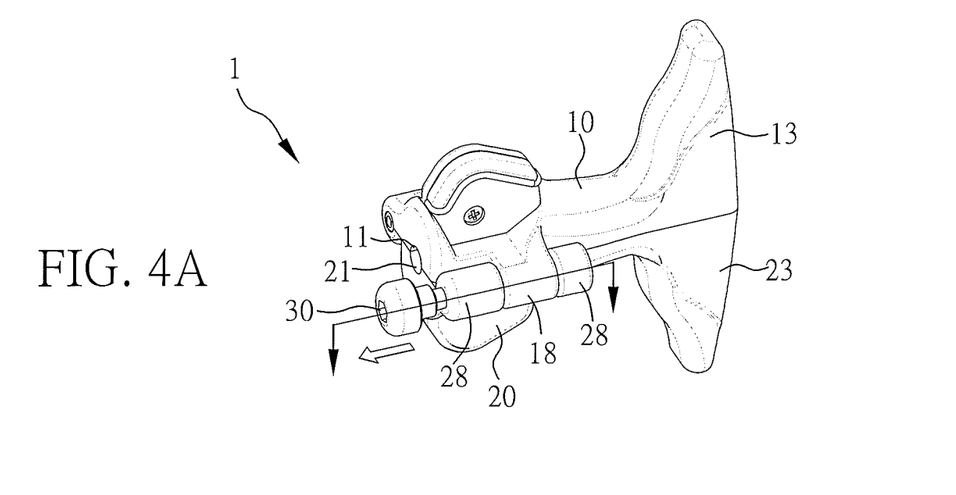
FIG. 4A is an operation view of the snap fastening element shown in FIG. 1.
Figure 4B:
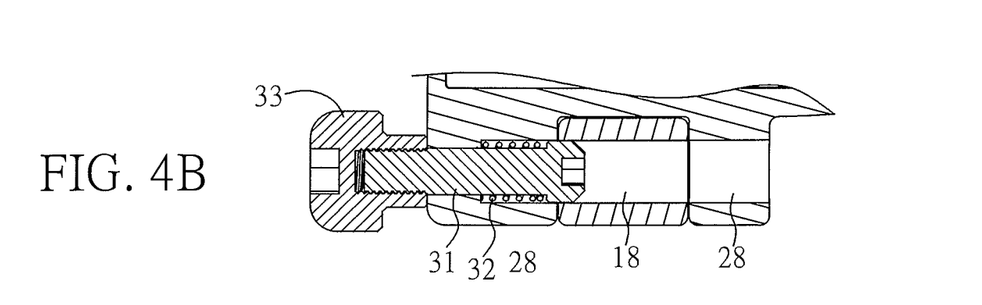
FIG. 4B and FIG. 4C are sectional view of the snap fastening element shown in FIG. 4A in operation.
Figure 4C:
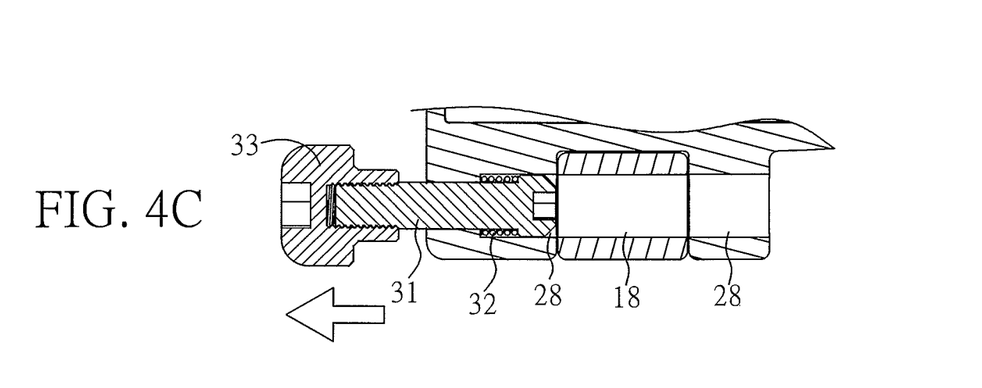

Referring to FIG. 4A to FIG. 4C, FIG. 4A is an operation view of the snap fastening element shown in FIG. 1, and FIG. 4B and FIG. 4C are cross-sectional views of the snap fastening element shown in FIG. 4A in operation. When the cable stripping tool 1 is not in use, the snap shaft 31 is inserted into the first snap hole 18 and the second snap hole 28, as shown in FIG. 4B. When the user intends to use the cable stripping tool 1, he/she can pull out the cap 33 to disengage the snap shaft 31 from the first snap hole 18, then open the first main body element 10. When the user pulls out the cap 33, the elastic element 32 is compressed. Therefore, when the user stops pulling the cap 33, the elastic element 32 can provide the elastic force to move the snap shaft 31 and the cap 33 back to their original positions.

Figure 5:
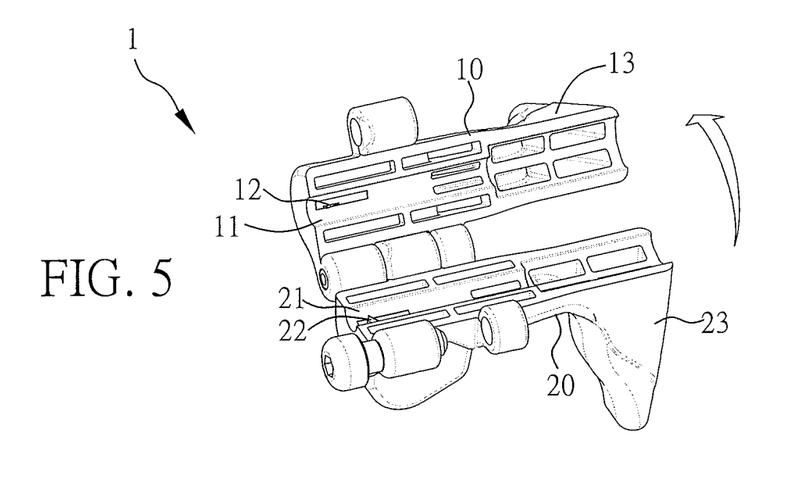
FIG. 5 is a schematic diagram of opening the cable stripping tool shown in FIG. 1.

When the snap shaft 31 is disengaged from the first snap hole 18, the user can further move the first main body element 10 using the first pivoting portion 14 and the second pivoting portion 24 as axes and rotates with respect to the second main body element 20, thereby opening the cable stripping tool 1, as shown in FIG. 5. FIG. 5 is a schematic diagram of opening the cable stripping tool shown in FIG. 1. Next, the wire 9 is placed in the second cable containing groove 21 (or the first wire containing groove 11). As shown in FIG. 6, FIG. 6 is a schematic diagram of placing the wire on the cable stripping tool shown in FIG. 5. At this time, the second blade 22 protruding from the second cable containing groove 21 presses against (or punctures) the outer surface of the wire 9.

Furthermore, since the first pivoting portion 14 of the present embodiment is located at the side surface 104 adjacent to the first cable containing groove 11, and the second pivoting portion 24 is similarly located at the side surface 204 adjacent to the second cable containing groove 21, when the first main body element 10 is opened, the first cable containing groove 11 and the second cable containing groove 21 are open without any obstruction. Therefore, a last section or a middle section of both sides of the wire 9 (the last section is shown in the figure) may be directly placed in the second cable containing groove 21 (or the first cable containing groove 11) for convenience and ease of use.

Figure 7:
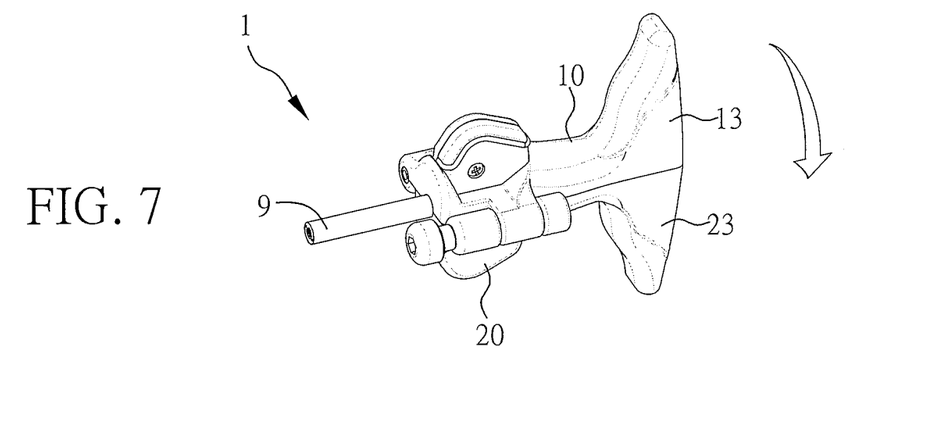
FIG. 7 is a schematic diagram of the first main body element shown in FIG. 6 being reversed back to the closed state.

Next, the first main body element 10 is reversed back to the closed state, that is, the first cable containing groove 11 is moved along the opposite direction of that shown in FIG. 5 back to the position facing the second cable containing groove 21, as shown in FIG. 7. FIG. 7 is a schematic diagram of the first main body element shown in FIG. 6 being reversed back to the closed state. After the first main body element 10 is reversed back to the closed state, the cap 33 is pulled out again to insert the snap shaft 31 back to the first snap hole 18. At this time, the wire 9 is placed between the first cable containing groove 11 and the second cable containing groove 21, and the wire 9 is parallel to the longitudinal axis X, while the first blade 12 and the second blade 22 respectively puncture the outer surface of the wire 9. Furthermore, since the extending direction of the first handling portion 13 and the second handling portion 23 is perpendicular to that of the longitudinal axis X, so the first handling portion 13 and the second handling portion 23 are located at two opposite sides of the wire 9 respectively.

Figure 8A:
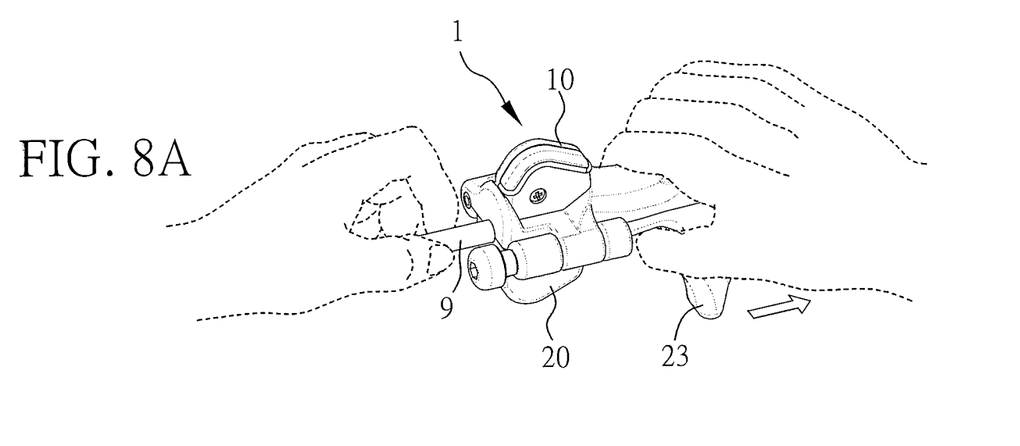
FIG. 8A and FIG. 8B are operation views of the cable stripping tool shown in FIG. 7 stripping the outer surface of the wire.
Figure 8B:
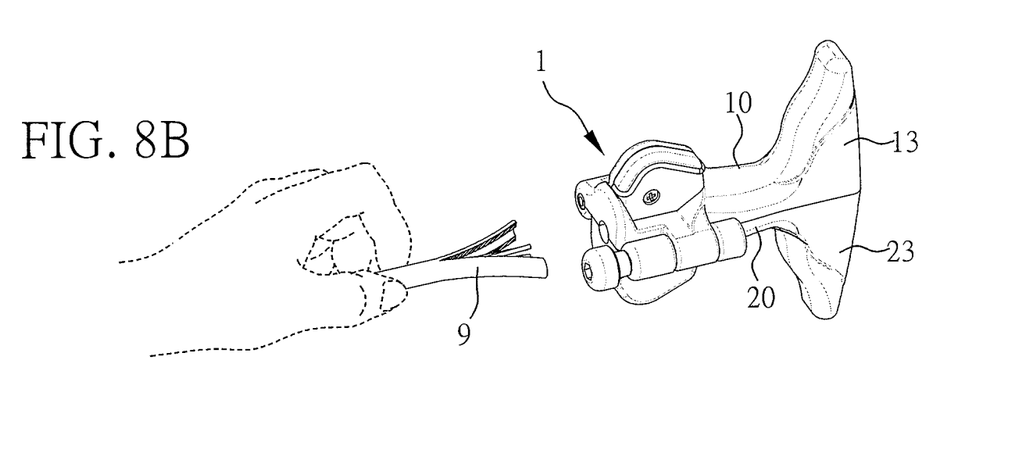

Finally, the user can grab the wire 9 with one hand and hold the first handling portion 13 and the second handling portion 23 with the other hand and move the wire toward the direction to be stripped, as shown in FIG. 8A and FIG. 8B. FIG. 8A and FIG. 8B are operation views of the cable stripping tool shown in FIG. 7. Since the first handling portion 13 and the second handling portion 23 are located at two opposite sides of the wire 9 respectively, it is easier for the user to apply a force to the cable stripping tool 1 to move the first blade 12 and the second blade 22 along the moving direction to strip the outer layer of the wire 9.

As shown in FIG. 2 and FIG. 3, the first pivoting portion 14 of the present embodiment is two first pivoting holes 141 and the second pivoting portion 24 is a second pivoting hole 241, and the second pivoting hole 241 is located between the two first pivoting holes 141. Besides, the cable stripping tool 1 further includes a pivot 40 inserted between the first pivoting holes 141 and the second pivoting hole 241. The two first pivoting holes 141 are located at the other side surface 104 of the first main body element 10 opposite to the first snap hole 18, and the second pivoting hole 241 is located at the other side surface 204 of the second main body element 20 opposite to the two second snap holes 28. In other words, the first main body element 10 and the second main body element 20 respectively have one side surface 104, 205 having two-hole structures (first pivoting holes 141, second snap holes 28) and the other side surface 105, 204 having a hole structure (a first snap hole 18, a second pivoting hole 241). Therefore, the first main body element 10 and the second main body element 20 of the present embodiment are substantially the same in configuration, so the manufacturing cost can be reduced (only one mold is required for manufacturing the first main body element 10 and the second main body element 20).

As described above, the cable stripping tool of the present invention includes the first main body element and the second main body element, which comprise the first cable containing groove and the second cable containing groove disposed along the longitudinal axis respectively. Furthermore, the first handling portion is extended from the side wall of first main body element, with the side wall opposite to the first cable containing groove, the second handling portion extending from the side wall of the second main body element, with the side wall opposite to the second cable containing groove. When the wire is placed in the cable stripping tool, the longitudinal axis and the wire are parallel to each other, and the first handling portion and the second handling portion are located at two opposite sides of the wire, thereby providing better user experience and convenience when the user applying a force to the cable stripping tool to strip the outer surface of the wire.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A cable stripping tool for stripping an outer surface of a cable, the cable stripping tool comprising:
    a first main body element having a longitudinal axis, the first main body element comprising:
    a first cable containing groove disposed along the longitudinal axis;
    a first blade disposed in the first main body element with at least a portion of the first blade protruding out of the first cable containing groove;
    a first handling portion extended from a first side wall of the first main body element, wherein the first side wall is opposite to the first cable containing groove;
    a first pivoting portion located on a first side surface of the first main body element, wherein the first side surface is adjacent to the first cable containing groove;
    a first snap hole;
    a second main body element comprising:
    a second cable containing groove corresponding to the first cable containing groove;
    a second blade disposed in the second main body element with at least a portion of the second blade protruding out of the second cable containing groove;
    a second handling portion extended from a second side wall of the second main body element, wherein the second side wall is opposite to the second cable containing groove; and
    a second pivoting portion located on a second side surface of the second main body element, wherein the second side surface is adjacent to the second cable containing groove and the second pivoting portion pivots to the first pivoting portion;
    two second snap holes, the first snap hole being located between the two second snap holes; and
    a snap fastening element disposed between the first main body element and the second main body element, the snap fastening element further comprising a snap shaft and an elastic element, the elastic element being sleeved on the snap shaft and disposed in one of the two second snap holes, and the snap shaft being disposed between the second snap hole with the elastic element within and the first snap hole.

2. The cable stripping tool as claimed in claim 1, wherein the second main body element opens and closes relative to the first main body element by using the first pivoting portion and the second pivoting portion as axes.

3. The cable stripping tool as claimed in claim 1, wherein the cable is disposed between the first cable containing groove and the second cable containing groove, and the longitudinal axis and the cable are parallel to each other.

4. The cable stripping tool as claimed in claim 1, wherein the first handling portion and the second handling portion extend in a direction perpendicular to that of the longitudinal axis.

5. The cable stripping tool as claimed in claim 1, wherein the first pivoting portion comprises two first pivoting holes, the second pivoting portion comprises a second pivoting hole located between the two first pivoting holes, and the cable stripping tool further comprises:

a pivot disposed between the two first pivoting holes and the second pivoting hole.

6. The cable stripping tool as claimed in claim 5, wherein the first snap hole is located at a third side surface of the first main body element, wherein the third side surface is opposite to the two first pivoting holes, the two second snap holes are located at a fourth side surface of the second main body element, wherein the fourth side surface is opposite to the second pivoting hole.

7. The cable stripping tool as claimed in claim 6, wherein the first main body element and the second main body element are essentially the same in configuration.

8. The cable stripping tool as claimed in claim 1, wherein the first main body element further comprises a first recess disposed adjacent to the first cable containing groove, the second main body element further comprises a second recess disposed adjacent to the second cable containing groove.

9. The cable stripping tool as claimed in claim 8, wherein the first cable containing groove and the first recess communicate with each other, the second cable containing groove and the second recess communicate with each other.

10. The cable stripping tool as claimed in claim 9, wherein the first cable containing groove is located at a front end of the first main body element, the first recess is located at a rear end of the first main body element, the second cable containing groove is located at a front end of the second main body element, the second recess is located at a rear end of the second main body element.

11. The cable stripping tool as claimed in claim 10, wherein the first handling portion is located at the rear end of the first main body element, the second handling portion is located at the rear end of the second main body element.

12. The cable stripping tool as claimed in claim 10, wherein the first main body element further comprises a first blade containing groove located at the front end of the first main body element, the second main body element further comprising a second blade containing groove located at the front end of the second main body element.

* * * * *